US011085802B2

(12) United States Patent
Küng et al.

(10) Patent No.: US 11,085,802 B2
(45) Date of Patent: Aug. 10, 2021

(54) METHOD OF OPERATING A MAGNETIC-INDUCTIVE FLOW METER FOR DETERMINING AND CORRECTING A FAULT OF ELECTRODE VOLTAGE DURING FEED PHASE

(71) Applicant: Endress+Hauser Flowtec AG, Reinach (CH)

(72) Inventors: Thomas Küng, Münchenstein (CH); Günther Bähr, Therwil (CH)

(73) Assignee: Endress+Hauser Flowtec AG, Reinach (CH)

( * ) Notice: Subject to any disclaimer, the term of this patent is extended or adjusted under 35 U.S.C. 154(b) by 129 days.

(21) Appl. No.: 16/471,618

(22) PCT Filed: Nov. 22, 2017

(86) PCT No.: PCT/EP2017/080056
§ 371 (c)(1),
(2) Date: Jun. 20, 2019

(87) PCT Pub. No.: WO2018/114189
PCT Pub. Date: Jun. 28, 2018

(65) Prior Publication Data
US 2019/0383652 A1      Dec. 19, 2019

(30) Foreign Application Priority Data
Dec. 20, 2016    (DE) .................... 10 2016 124 976.9

(51) Int. Cl.
*G01F 1/58*    (2006.01)
*G01F 1/60*    (2006.01)

(52) U.S. Cl.
CPC ............... *G01F 1/586* (2013.01); *G01F 1/60* (2013.01)

(58) Field of Classification Search
None
See application file for complete search history.

(56) References Cited

U.S. PATENT DOCUMENTS

| 4,597,295 | A | 7/1986 | Goto et al. | |
|---|---|---|---|---|
| 4,651,286 | A * | 3/1987 | Fukai | G01F 1/60 702/45 |
| 5,905,206 | A | 5/1999 | Herwig et al. | |
| 2004/0260484 | A1 | 12/2004 | Wray | |
| 2006/0095217 | A1 | 5/2006 | Coursolle et al. | |
| 2016/0258793 | A1 * | 9/2016 | Li | G01F 1/58 |

(Continued)

FOREIGN PATENT DOCUMENTS

| CN | 101268339 A | 9/2008 |
|---|---|---|
| CN | 101467010 A | 6/2009 |

(Continued)

*Primary Examiner* — Harshad R Patel
(74) *Attorney, Agent, or Firm* — Christopher R. Powers; Endress+Hauser (USA) Holding Inc.

(57) ABSTRACT

The present disclosure relates to a method for operating a magnetic-inductive flow meter for measuring the flow rate or the volumetric flow of a medium in a measuring tube and to such a flow meter, wherein the medium is acted upon by magnetic fields of different polarity and field strength, wherein the alternation between magnetic fields causes a voltage pulse in the medium, wherein a voltage pulse during a phase without a magnetic field is used for calculation of a correction of an electrode voltage characteristic.

17 Claims, 3 Drawing Sheets

(56) References Cited

U.S. PATENT DOCUMENTS

2016/0313155 A1* 10/2016 Iwashita ............... H03M 3/458
2019/0383653 A1* 12/2019 Kung ........................ G01F 1/60

FOREIGN PATENT DOCUMENTS

| | | |
|---|---|---|
| DE | 10312058 A1 | 9/2004 |
| DE | 102014119453 A1 | 6/2016 |
| EP | 2372317 A1 | 10/2011 |
| JP | 58015122 A | 1/1983 |
| JP | 58120118 A | 7/1983 |
| JP | 06273205 A | 9/1994 |
| JP | H07248240 * 9/1995 ............... G01F 1/60 | |
| JP | 3334995 B2 | 10/2002 |
| JP | 2004354205 A | 12/2004 |

* cited by examiner

METHOD OF OPERATING A MAGNETIC-INDUCTIVE FLOW METER FOR DETERMINING AND CORRECTING A FAULT OF ELECTRODE VOLTAGE DURING FEED PHASE

CROSS-REFERENCE TO RELATED APPLICATIONS

The present application is related to and claims the priority benefit of German Patent Application No. 10 2016 124 976.9, filed on Dec. 20, 2016 and International Patent Application No. PCT/EP2017/080056 filed on Nov. 22, 2017, the entire contents of which are incorporated herein by reference.

TECHNICAL FIELD

The invention relates to a method for operating a magnetic-inductive flow meter for measuring the flow rate or the volumetric flow of a medium in a measuring tube, and to such a flow meter.

BACKGROUND

Magnetic-inductive flow meters have been used for a long time for flow measurement. The principle of magnetic-inductive flow measurement is based upon the induction of a flow-dependent electrical voltage in a conductive medium flowing through a measuring tube by a magnetic field, which magnetic field is oriented perpendicular to the flow direction. The magnetic field is usually generated by a coil system having one or more coils. The flow-dependent voltage is tapped from at least two measuring electrodes and evaluated by a measuring device. The flow of the medium through the pipeline can thus be determined from the measured voltage and the known magnetic field. Magnetic fields of alternating polarity are usually applied to the medium in order to minimize fault effects, which, irrespective of the presence of a magnetic field, lead to a measurable voltage between the measuring electrodes, and thus falsify a flow measurement. The document DE10312058A1 describes such a flow meter. Another possibility for detecting fault effects is to configure idle phases without a magnetic field between phases with a magnetic field and to measure the fault effects. This is proposed in the document U.S. Pat. No. 4,597,295A. A disadvantage with both reactions is the fact that, after changing to a magnetic field with inverted polarity or when there is a switch between a phase with magnetic field and a rest phase with a flow measurement or a measurement of the fault effects, it is necessary to wait until the flow meter reaches a steady state. Thus, valuable time is lost, which is then unavailable for flow rate measurement. The aim of the invention is therefore to propose a method for operating a magnetic-inductive flow meter and such a flow meter by which the time loss is minimized.

SUMMARY

In a method according to the invention for operating a magnetic-inductive flow meter for measuring the flow rate or the volumetric flow of a medium in a measuring tube,
which magnetic-inductive flow meter comprises:
    a measuring tube for guiding the medium;
    a magnet system with at least one coil system for generating a magnetic field in the medium, wherein the magnetic field is substantially perpendicular to a measuring tube axis, wherein the magnetic field is caused by applying an electric coil voltage to the coil system;
    at least one pair of measuring electrodes, arranged in the measuring tube, for detecting an electrode voltage, induced by the magnetic field, in the medium, wherein the electrode voltage is substantially proportional to the flow rate and to the field strength of the magnetic field, wherein the electrode voltage is caused by a charge carrier separation caused by the flow of the medium through the magnetic field;
    a measuring/operating circuit for operating the magnet system and evaluating the electrode voltage;
    during a feed phase, the magnetic field is generated and the electrode voltage is detected, wherein the feed phase has a measuring phase, in which measuring phase the magnetic field is substantially constant, wherein a measured value of the electrode voltage is used during the measuring phase to calculate the flow rate of the medium;
    wherein a magnetic field of reversed polarity is generated during a subsequent feed phase,
    wherein, in a first method step, when a feed phase change is selected between a previous feed phase and a subsequent feed phase, a rest phase is configured, in which rest phase no electrical coil voltage, at least to some extent, is applied to the coil system;
    wherein, in a second method step, the electrode voltage is detected during the rest phase;
    wherein the switching of the magnetic field between different phases causes the generation of an electrical voltage pulse in the medium, wherein each phase can be a feed phase or a rest phase,
    wherein, in a third method step, information from a voltage pulse of the rest phase is used to determine a fault of the electrode voltage during a feed phase by a voltage pulse during the feed phase.

In particular, a rest phase does not have to be configured for each feed phase change; for example, a rest phase can be configured at every nth feed phase change, wherein n is a positive natural number. An irregular sequence of rest phases can also be configured, wherein the irregularity is based, for example, upon a randomized algorithm.

The magnet system can also have, in addition to the at least one coil system, a field feedback loop for guiding the magnetic field outside of the measuring tube. Furthermore, the magnet system can have at least one pole shoe, which is configured to conduct the magnetic field between coil system and measuring tube. The at least one coil system can in each case have a coil core.

The electrode voltage is generated by a deflection of charge carriers caused by the flow of the medium through the measuring tube via the magnetic field, wherein the deflection direction depends upon the polarity of the charge carriers. This results in a separation of positively-charged charge carriers from negatively-charged ones and, thus, an electrical voltage.

In one embodiment of the method, after the fault is determined, the characteristic of the electrode voltage during the feed phase preceding the rest phase and/or the feed phase following the rest phase is corrected as a function of the fault.

In one embodiment of the method, an averaged fault is calculated by averaging the determined faults of at least two rest phases, wherein the value of the electrode voltage or the measured value of the electrode voltage of a feed phase is corrected after calculation of the averaged fault.

In one embodiment of the method, the electrode voltage is sampled at least twice during the feed phase or during the rest phase, and, in particular, at least twenty times and, preferably, at least fifty times.

In one embodiment of the method, a correction of the fault includes subtracting a characteristic of a voltage pulse of a rest phase from a characteristic of the electrode voltage during a feed phase.

In one embodiment of the method, a correction of the fault includes a fitting of the characteristic of a voltage pulse of at least one rest phase, wherein the fitting function gives information about time point and amplitude of a voltage pulse maximum and/or characteristic of the amplitude drop of the voltage pulse and/or time point a final state is reached and/or gives properties of the final state and/or a pulse width of the voltage pulse, wherein the fault is determined on the basis of the fit parameters obtained by the fits or on the basis of fitting function parameters, wherein the final state is a state of a steady-state measuring system, wherein the measuring system comprises the magnet system and the medium in the region of the magnetic field, as well as the measuring electrodes with leads to the measuring/operating circuit.

The fitting function can be selected from a purely mathematical viewpoint. However, it is also possible to use physical or technical conditions in the selection of the fitting function and/or when parameters of the fitting function are limited.

In one embodiment of the method, the fit resorts to a function having a global extreme, at least in a first time interval.

In one embodiment of the method, the fit resorts to a monotonically-falling function, e.g., a power function, at least in a second time interval.

In one embodiment of the method, the fitting functions or fitting function parameters are selected by means of a look-up table.

In one embodiment of the method, a measured value of a first impedance of a circuit comprising the measuring electrodes and feed lines of the measuring electrodes to the measuring/operating circuit and the medium and/or a second impedance of the medium is used during fitting or during selection of the fitting function.

In one embodiment of the method, the measurement value of the first impedance is determined by means of the measuring electrodes, and/or wherein the measured value of the second impedance is determined by means of an impedance probe, wherein the impedance probe belongs, for example, to the magnetic-inductive flow meter. However, the impedance probe can also be an external probe, the measured value of which is transmitted via an interface of the measuring/operating circuit.

In one embodiment of the method, at least device-type and/or an exemplary-type and/or an application-specific parameter is used in the fitting or in the selection of the fitting function.

In one embodiment of the method, n is selectable, wherein a selection criterion is a flow or flow change of the medium.

In one embodiment of the method, the magnitudes of the magnetic fields of the measuring phases of adjacent feed phases differ by less than 1% and, in particular, less than 0.1% from each other.

In one embodiment of the method, the rest phases underlying the calculation of the averaged fault precede the first feed phase.

In one embodiment of the method, the rest phases underlying the calculation of the averaged fault precede the first feed phase at least to some extent, wherein the calculation of the rest phases underlying the calculation of the averaged fault follow the first feed phase, at least to some extent.

In one embodiment of the method, a difference in corrected measured values of the electrode voltage or a difference in corrected electrode voltages of the measuring phases of two consecutive feed phases or a measuring phase and a rest phase preceding or following the measuring phase is used to determine a flow measurement value.

A magnetic-inductive flow meter according to the invention for measuring the flow rate or the volumetric flow of a medium in a measuring tube comprises:

a measuring tube, which is configured to conduct the medium;

a magnet system having at least one coil system, which magnet system is configured to generate a magnetic field in the medium, the magnetic field being substantially perpendicular to a measuring tube axis;

at least one pair of measuring electrodes arranged in the measuring tube, which electrodes are configured to detect a voltage, induced by the magnetic field, in the medium, which voltage is substantially proportional to the flow rate and the field strength of the magnetic field;

a measuring/operating circuit that is configured to implement the method according to the invention, to operate the magnet system, and to evaluate the voltage detected by the pair of measuring electrodes.

In one embodiment, the flow meter has an impedance probe for detecting the impedance of the medium.

In one embodiment of the flow meter, the measuring/operating circuit has an interface for transmitting or accepting information relating to an externally-determined impedance of the medium.

In one embodiment, the magnet system comprises at least one field feedback loop which is designed to at least partially conduct the magnetic field outside the measuring tube between the measuring tube side opposite the coil system and the coil system.

BRIEF DESCRIPTION OF THE DRAWING

The invention will now be described with reference to exemplary embodiments.

DETAILED DESCRIPTION

Figure 1:
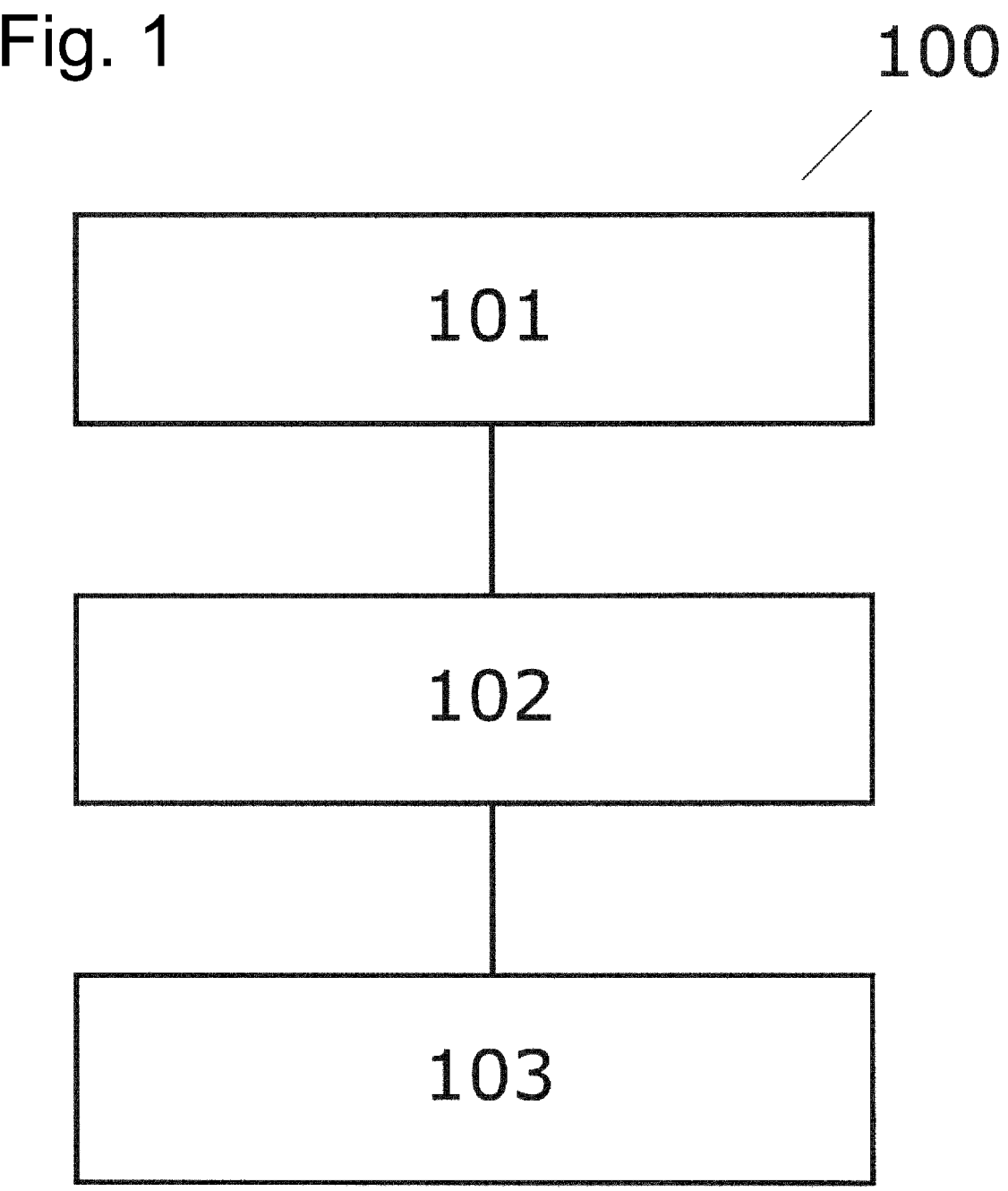
FIG. 1 shows a schematic method sequence for operating a magnetic-inductive flow meter according to the invention.

FIG. 1 sketches a sequence of a method 100 according to the invention for operating a magnetic-inductive flow meter (1). As described in FIG. 3, such a flow meter comprises:

a measuring tube (10) for guiding the medium;

a magnet system (20) having at least one coil system (21) for generating a magnetic field in the medium, wherein the magnetic field is substantially perpendicular to a measuring tube axis, wherein the magnetic field is caused by applying an electric voltage to the coil system;

at least one pair of measuring electrodes (31, 32), arranged in the measuring tube, for detecting an electrode voltage, induced by the magnetic field, in the medium, the electrode voltage being substantially proportional to the flow rate and the field strength of the magnetic field;

and a measuring/operating circuit for implementing the method of the invention.

During the operation of the flow meter, during a feed phase, the magnetic field is generated and the electrode voltage is detected, wherein the feed phase has a measuring phase, in which measuring phase the magnetic field is substantially constant, wherein a measured value of the electrode voltage is used during the measuring phase to calculate the flow rate of the medium.

A magnetic field of reversed polarity is generated during a subsequent feed phase.

In a first method step 101 according to the invention, if a feed phase change is selected between a preceding feed phase and a subsequent feed phase, a rest phase is configured, in which rest phase no electrical coil voltage, at least to some extent, is applied to the coil system.

In particular, a rest phase does not have to be configured for each feed phase change; for example, a rest phase can be configured at every nth feed phase change, wherein n is a positive natural number. An irregular sequence of rest phases can also be configured, wherein the irregularity is based, for example, upon a randomized algorithm. In a filling process, it may be advantageous to configure rest phases only in sections, wherein it is possible, in an initial phase and in an end phase of the filling process, due to strong changes in the flow rate, to dispense with rest phases, and wherein, in an intermediate phase of the filling process, rest phases are configured. An irregular sequence of rest phases attenuates aliasing effects.

In a second method step 102 according to the invention, the electrode voltage is detected during the rest phase.

Switching between different phases causes the generation of an electrical voltage pulse in the medium, which phases are feed phases or rest phases.

In a third method step 103 according to the invention, a fault of the electrode voltage in a feed phase is calculated on the basis of information from a voltage pulse during the rest phase.

Figure 2:
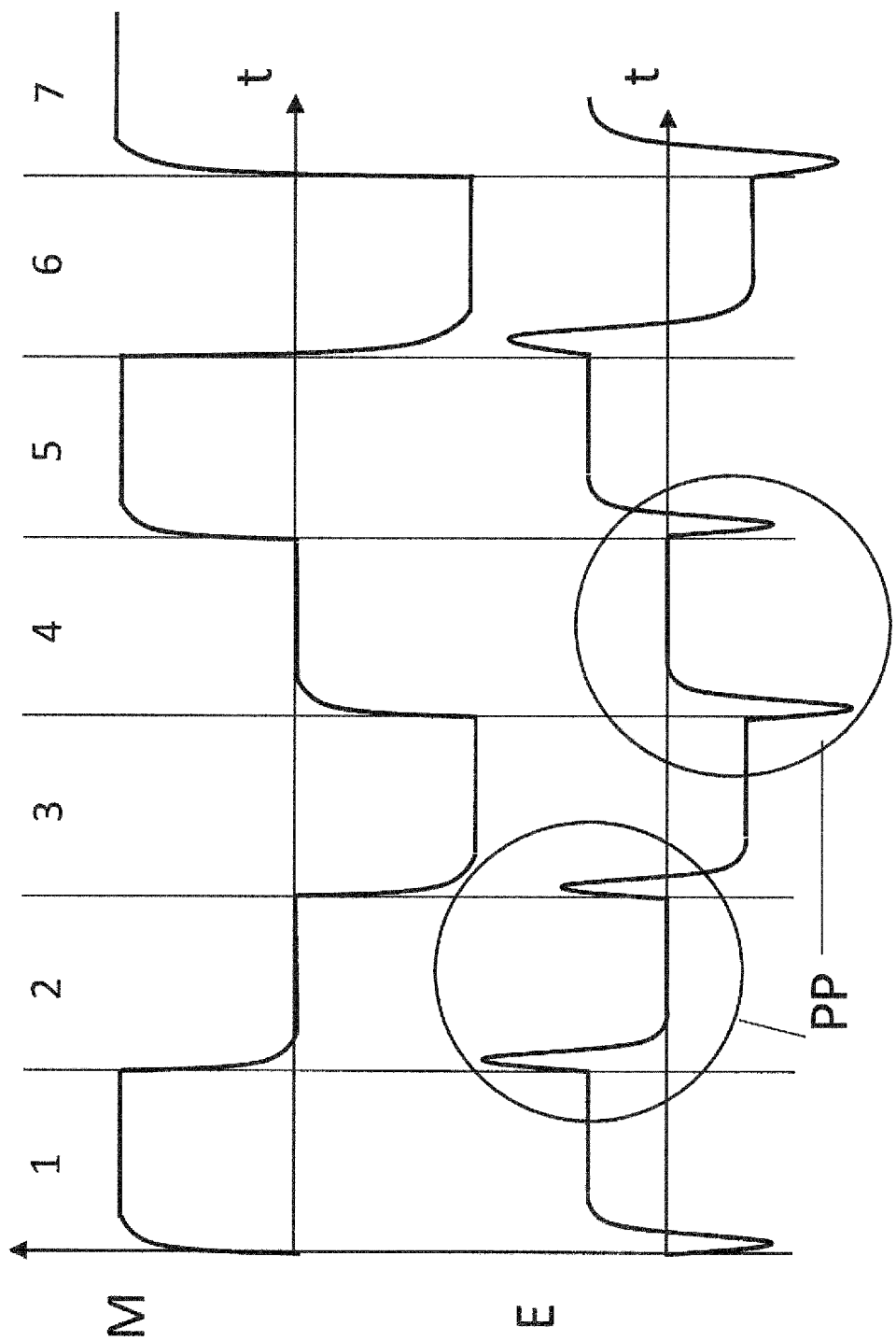
FIG. 2 shows a detail of exemplary characteristics of magnetic fields and electrode voltages.

FIG. 2 sketches an exemplary and schematic detail of characteristics of magnetic fields and electrode voltages over a time t over several phases, wherein an upper curve M shows the characteristic of magnetic fields during phases 1 through 7, and wherein a lower curve E shows the characteristic of electrode voltages during phases 1 through 7. The characteristic of the magnetic fields or electrode voltages during a single phase is characterized by a transient condition in a final state at the beginning of the phase and by remaining in the final state after termination of the transient condition, wherein the transient recovery time of the magnetic fields is shorter than the transient recovery time of the electrode voltages. A final state is reached as soon as a transient condition can no longer be detected by measurement technology. The electrode voltages during the final states are flow-dependent. This is due to the fact that the electrode voltages react to the magnetic fields, wherein these reactions then also cause barrier effects at the medium/measuring electrode interfaces, which have a transient recovery time that is a function of the conductivity of the medium, which is frequently longer than the transient recovery time of the magnetic fields. The value of the electrode voltage during the final state is given by the current flow rate of the medium. During a feed phase (see phases 1, 3, 5, 6, and 7), the magnetic system applies a magnetic field to the medium at least in sections, wherein the magnetic field is generated by driving a coil system with a coil current. During a rest phase (see phases 2 and 4), a coil voltage is switched off, so that the magnetic field drops to zero. The value of the electrode voltage during a final state of a rest phase provides information about influences on the electrode voltage, which are not attributable to a static magnetic field during the feed phase.

For measuring a flow, an electrode voltage or a measured value of an electrode voltage is used at least during a final state of a feed phase or during a rest phase. More specifically, to measure the flow rate, a difference in measured values of the electrode voltage or a difference in electrode voltages of two consecutive feed phases or a feed phase and a rest phase preceding or following the feed phase is used to determine a flow measurement value.

The electrode voltage after a switching operation of the magnet system depends not only on the dynamics of the magnet system, but also on the dynamic behavior of the barriers. The dynamics of the electrode voltage are influenced by the magnetic field and the change in the magnetic field during phase change, and by the effect of the barrier at the measuring electrode/medium interface. With switching, the electrode voltage exhibits a voltage pulse which decays to a substantially constant voltage state, wherein the decay results, inter alia, from a decay of the voltage across the barrier, wherein the voltage pulse represents a fault of the electrode voltage as a result of the change in the magnetic field and the charge of a barrier capacitance. The polarity of a voltage pulse depends upon the polarity of the change in the magnetic field with phase change, so that, when there are two successive phase changes with a magnetic field change of the same polarity, a voltage pulse of the same polarity occurs in each case, which voltage pulses represent a pulse pair PP. This is illustrated in the phase changes from phase 1 to phase 2 and during the change from phase 2 to phase 3, and also during the phase changes from phase 3 to phase 4 and during the change from phase 4 to phase 5.

In methods for operating a magnetic-inductive flow meter according to the prior art, once an electrode voltage or a measured value of an electrode voltage for calculating a flow is detected, there is a wait until the transient condition of the electrode voltage has occurred, from which it follows that the transient phase is useless for a flow measurement.

By determining the voltage characteristic of the electrode voltage during a rest phase, the fault of the electrode voltage during a feed phase can be corrected by a voltage pulse, because the voltage pulse during a rest phase exhibits the essence of the fault. The correction of the electrode voltage during the feed phase allows the electrode voltage to be used during the transient phase of the electrode voltage for a flow measurement, so that either a duration of a feed phase can be shortened or the proportion of a feed phase which can be used to measure the flow rate can be increased. Both variants enable an improvement in the signal-to-noise ratio of the flow measurement. Usually, the electrode voltage is scanned several times during a feed phase or during a rest phase. In a simple variant of the correction, a characteristic of the electrode voltage during a rest phase of a characteristic of the electrode voltage during a feed phase is subtracted. In order to better detect the characteristic of the electrode voltage during a rest phase, an averaging of characteristics of the electrode voltage of several rest phases can, in one embodiment of the method, be performed, in order to correct the characteristic of the electrode voltage during a feed phase. In one embodiment of the method, the characteristic of the electrode voltage can be filtered during a rest phase, wherein the correction of the characteristic of the electrode voltage during a feed phase is based upon the fit parameters determined by the fit. For instance, a function characteristic characterized by the fit parameters is thereby subtracted from the characteristic of an electrode voltage during a feed phase. It is also possible to average fits or fit parameters of characteristics of the electrode voltage of several rest phases. For example, a function used for fitting the characteristic of the electrode voltage during a rest phase can be searched from a look-up table, in which look-up table at least one device-type and/or at least one exemplary-type and/or at least one application-specific parameter are stored, which parameters are linked to suitable fitting functions and/or fitting function parameters.

The fitting may also incorporate a measured value of a first impedance and a second impedance, wherein the first impedance is the impedance of a circuit comprising the measuring electrodes as well as the medium, and wherein the second impedance is an impedance of the medium.

After subtraction of the functional characteristic from the characteristic of the electrode voltage during a feed phase, the characteristic of the electrode voltage during the feed phase has, in the case of a substantially constant flow, a longer region with substantially constant voltage, which region can be used for a flow measurement. In the case of rapid changes in the flow during the feed phase, the electrode voltage can also increase or decrease in the steady state.

The sequence of phases outlined in FIG. 2 is exemplary. The separation of two feed phases by a rest phase can, for example, only take place after several feed phase changes without a rest phase. Since the voltage pulses generated when switching from one feed phase to a next feed phase have, to a good approximation, a double amplitude compared to voltage pulses which are caused when switching between a feed phase and a rest phase, it is necessary to incorporate, for example, a factor of 2 in a correction of characteristics of the electrode voltage after a change from a feed phase to a feed phase. In the case of saturation effects, the factor may also deviate from 2 because of nonlinear effects and be ascertained or estimated using physical boundary conditions.

The characteristics of the individual magnetic fields are exemplary. In particular, an overvoltage can be applied to the coil system at the onset of a phase, so that the magnetic field more quickly achieves a desired state. In this case, an actual magnetic field profile may deviate from the characteristics shown in FIG. 2.

Figure 3:
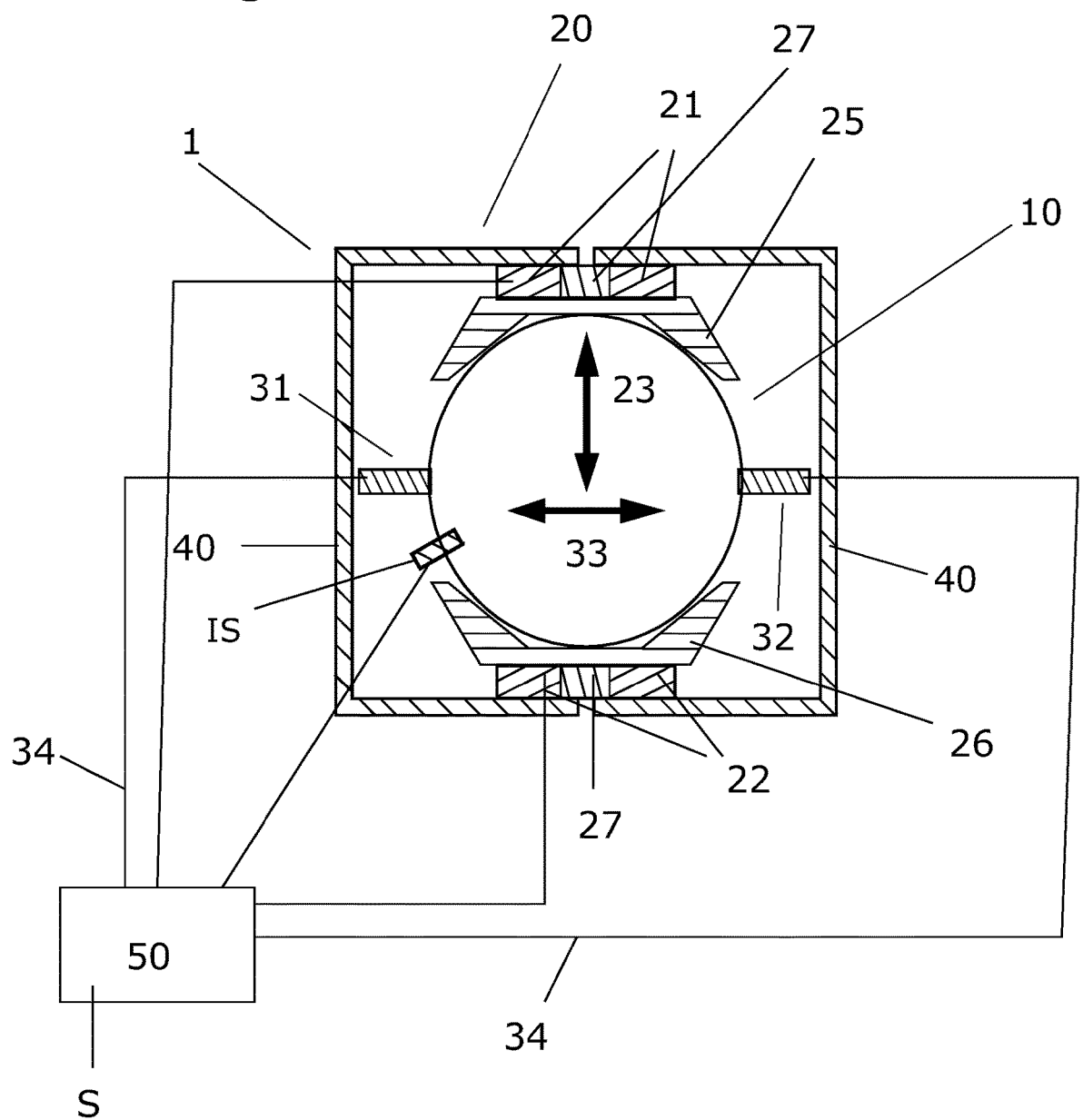
FIG. 3 shows a cross-section through a magnetic-inductive flow meter according to the invention.

FIG. 3 shows a cross-section through a magnetic-inductive flow meter 1 according to the invention having a measuring tube 10; a magnet system 20 with coil systems 21 and 22 each having a coil core 27, pole shoes 25 and 26; and measuring electrodes 31 and 32 for detecting a voltage induced in the medium. The magnet system applies a magnetic field, which is aligned in the direction of arrow 23, to the medium in the measuring tube 10. The magnetic field and the flow of the medium through the measuring tube ensure that an electrode voltage is generated in the direction of arrow 33. The magnetic-inductive flow meter may further include a field return loop 40 and/or an impedance probe 60. The measuring electrodes 31, 32, as well as the coil system 21, 22, as well as the impedance probe, are connected to a measuring/operating circuit 50, which measuring/operating circuit 50 is configured to operate the coil system, the measuring electrodes, and, possibly, the impedance probe. The impedance probe is configured to detect the impedance of the medium. Alternatively or in addition to the impedance probe 60, the measuring/operating circuit 50 can have an interface S for communication or acceptance of information regarding an externally-determined impedance of the medium.

The invention claimed is:

1. A method for operating a magnetic-inductive flow meter for measuring a flow rate or a volumetric flow of a medium flowing in a measuring tube, the method comprising:
   providing a magnetic-inductive flow meter comprising:
      a measuring tube adapted for guiding the medium and having a measuring tube axis;
      a magnet system including a coil system configured to generate a magnetic field in the medium, wherein the magnetic field is generated by applying an electric coil voltage to the coil system, and wherein the magnetic field is perpendicular to the measuring tube axis;
      a pair of measuring electrodes disposed in the measuring tube and configured to detect an electrode voltage induced by the magnetic field in the medium, the electrode voltage being proportional to a flow rate of the medium flowing in a measuring tube and to the field strength of the magnetic field; and
      a measuring/operating circuit configured to operate the magnet system and to operate upon the electrode voltage;
   defining a feed phase during which the magnetic field is generated and the electrode voltage is detected, wherein the feed phase includes a measuring phase during which the magnetic field is constant and a measured value of the electrode voltage detected, wherein the measured value of the electrode voltage is used to calculate the flow rate of the medium;
   reversing the polarity of the generated magnetic field during a subsequent feed phase;
   switching the feed phase between a previous feed phase and a subsequent feed phase;
   when selected, configuring a rest phase between the previous feed phase and the subsequent feed phase, wherein during the rest phase no electrical coil voltage, at least to some extent, is applied to the coil system and the electrode voltage is detected, wherein switching between either feed or rest phases generates a voltage pulse in the medium;
   determining a fault of the electrode voltage in the feed phase based on information from a voltage pulse of the rest phase; and
   after determining the fault, correcting a characteristic of the electrode voltage during the feed phase preceding the rest phase, and/or the feed phase following the rest phase, as a function of the fault, wherein:
      correction of the characteristic of the electrode voltage includes fitting a characteristic of a voltage pulse of at least one rest phase with a fitting function, thereby generating a fit;
      the fitting includes information about a time point and amplitude of a voltage pulse maximum and/or a characteristic of an amplitude drop of the voltage pulse and/or a time point that a final state is reached and/or properties of the final state and/or a pulse width of the voltage pulse;
      the fault is determined based on fit parameters of the fit;
      a measured value of a first impedance of a circuit, which includes the measuring electrodes, feed lines of the measuring electrodes to the measuring/operating circuit and the medium, and/or of a second impedance of the medium, is used in the fitting or the selection of the fitting function; and
      the final state is a state of a steady-state measurement system.

2. The method of claim 1, wherein the electrode voltage is detected at least twice during the feed phase or during the rest phase.

3. The method of claim 1, further comprising:
calculating an averaged fault by averaging the determined faults of at least two rest phases; and
correcting a characteristic of the electrode voltage of the feed phase as a function of the averaged fault.

4. The method of claim 3, wherein correction of the characteristic of the electrode voltage includes subtracting a characteristic of the voltage pulse of the rest phase from a characteristic of the electrode voltage during the feed phase.

5. The method of claim 3, wherein the rest phases underlying the calculation of the averaged fault precede a first feed phase.

6. The method of claim 3, wherein the rest phases underlying the calculation of the averaged fault precede the feed phase at least to some extent, wherein the rest phases underlying the calculation of the averaged fault follow the feed phase at least to some extent.

7. The method of claim 1, wherein the fit, at least in a first time interval, resorts to a function with a global extreme.

8. The method of claim 1, wherein the fit, at least in a second time interval, resorts to a monotonically-falling function.

9. The method of claim 1, wherein the fitting function or parameters of the fitting function are selected from a look-up table.

10. The method of claim 1, wherein the measured value of the first impedance is determined using the measuring electrodes, and/or wherein the measured value of the second impedance is determined using an impedance probe.

11. The method of claim 1, wherein at least one device-type and/or at least one exemplary-type and/or at least one application-specific parameter is used in the fitting or in the selection of the fitting function.

12. The method of claim 1, wherein the rest phase can be configured at every nth feed phase change, wherein n is selectable, and wherein a selection criterion for n is a flow rate or a change in the flow rate of the medium.

13. The method of claim 1, wherein magnitudes of the magnetic fields of the measuring phases of adjacent feed phases differ by less than 1% from each other.

14. The method of claim 1, wherein a difference in corrected measured values of the electrode voltage or a difference in corrected electrode voltages of the measuring phases of two consecutive feed phases, or a measuring phase and a rest phase preceding or following the measuring phase, is used to determine a flow measurement value.

15. A magnetic-inductive flow measuring device for measuring a flow rate or a volumetric flow of a medium flowing in a measuring tube, the device comprising:
a measuring tube configured to conduct the medium;
a magnet system, including at least one coil system, configured to generate a magnetic field in the medium, the magnetic field being perpendicular to a measuring tube axis;
at least one pair of measuring electrodes disposed in the measuring tube, which electrodes are configured to detect a voltage, induced by the magnetic field, in the medium, which voltage is proportional to the flow rate and the field strength of the magnetic field; and
a measuring/operating circuit configured to:
define a feed phase during which the magnetic field is generated and the electrode voltage is detected, wherein the feed phase includes a measuring phase during which the magnetic field is constant and a measured value of the electrode voltage detected, wherein the measured value of the electrode voltage is used to calculate the flow rate of the medium;
reverse the polarity of the generated magnetic field during a subsequent feed phase;
switch the feed phase between a previous feed phase and a subsequent feed phase;
when selected, configuring a rest phase between the previous feed phase and the subsequent feed phase, wherein during the rest phase no electrical coil voltage, at least to some extent, is applied to the coil system and the electrode voltage is detected, wherein switching between either feed or rest phases generates a voltage pulse in the medium;
determine a fault of the electrode voltage in the feed phase based on information from a voltage pulse of the rest phase; and
after determining the fault, correcting a characteristic of the electrode voltage during the feed phase preceding the rest phase, and/or the feed phase following the rest phase, as a function of the fault, wherein:
correction of the characteristic of the electrode voltage includes fitting a characteristic of a voltage pulse of at least one rest phase with a fitting function, thereby generating a fit;
the fitting includes information about a time point and amplitude of a voltage pulse maximum and/or a characteristic of an amplitude drop of the voltage pulse and/or a time point that a final state is reached and/or properties of the final state and/or a pulse width of the voltage pulse;
the fault is determined based on fit parameters of the fit;
a measured value of a first impedance of a circuit, which includes the measuring electrodes, feed lines of the measuring electrodes to the measuring/operating circuit and the medium, and/or of a second impedance of the medium, is used in the fitting or the selection of the fitting function; and
the final state is a state of a steady-state measurement system.

16. The device of claim 15, further comprising an impedance probe configured to detect an impedance of the medium, wherein the measuring/operating circuit is further configured to operate the impedance probe.

17. The device of claim 15, wherein the measuring/operating circuit includes an interface adapted for communication or acceptance of information regarding an externally-determined impedance of the medium.

* * * * *